United States Patent [19]

Vogel

[11] 4,176,741
[45] Dec. 4, 1979

[54] ARTICLE TRANSFER MECHANISM

[75] Inventor: Walter H. Vogel, Hoffman Estates, Ill.

[73] Assignee: Redington Inc., Chicago, Ill.

[21] Appl. No.: 833,435

[22] Filed: Sep. 15, 1977

[51] Int. Cl.² ............................................. B65G 47/26
[52] U.S. Cl. .................................... 198/457; 198/459; 198/779
[58] Field of Search ................................ 198/382–384, 198/399, 457, 459, 461, 482, 728, 779, 793, 796, 725, 733, 412, 413

[56] References Cited

U.S. PATENT DOCUMENTS

| | | | |
|---|---|---|---|
| 1,330,813 | 2/1920 | Lister | 198/725 |
| 2,978,120 | 4/1961 | Agnello et al. | 198/725 |
| 3,292,767 | 12/1966 | Lobdell et al. | 198/459 |
| 3,300,021 | 1/1967 | Holmes | 198/382 |
| 3,373,860 | 3/1968 | Lindgren et al. | 198/459 |

*Primary Examiner*—Joseph E. Valenza

*Attorney, Agent, or Firm*—Vogel, Dithmar, Stotland, Stratman & Levy

[57] ABSTRACT

Article transfer mechanism for changing the direction of movement of articles while maintaining the orientation of the articles, including an infeed conveyor conveying articles in a first direction while in a predetermined orientation, a transfer conveyor having a continuous belt with a plurality of groups of rollers thereon with windows therebetween receiving articles from the infeed conveyor, a plate disposed below the lower reach of the transfer conveyor and closing at least one of the windows to provide a container for an article deposited thereon, structure for rotating the groups of rollers to cause the rollers to move an article deposited thereon into the adjacent window, an article conveyor having a plurality of pockets open at the top for receiving articles from the plate of a transfer conveyor for conveying the articles in a different direction from that of the infeed conveyor; there also is shown conveyors for equally spacing randomly spaced articles and for laterally aligning articles.

7 Claims, 12 Drawing Figures

ARTICLE TRANSFER MECHANISM

BACKGROUND OF THE INVENTION

The present invention relates generally to improvements in article transfer mechanisms, and specifically to the provision of article transfer mechanisms wherein the direction of movement of the articles may be changed while maintaining the orientation of the articles fixed.

Many types of article transfer mechanisms have been provided heretofore. However, none of these prior transfer mechanisms have been as simple and rugged in construction as the article transfer mechanisms in the present invention, and still have the ability to change the direction of movement, such as at right angles, of the articles while maintaining a fixed orientation thereof in space.

An examplar of the heretofore more complicated transfer mechanisms is illustrated in U.S. Pat. No. 3,941,233 granted Mar. 2, 1976 to F. Aiuola et al. This patent shows a relatively complicated suction transfer device that serves to change the direction of travel of the articles 90° but also changes the orientation thereof in space.

SUMMARY OF THE INVENTION

The present invention provides an article transfer mechanism that can change the direction of movement of articles, for example through 90°, while maintaining the orientation of the articles in space.

This is accomplished in the present invention, and it is an object of the present invention to accomplish these desired results, by providing a transfer mechanism that includes an infeed conveyor for conveying articles in a first direction while maintaining the articles in a predetermined orientation, the transfer conveyor having a plurality of containers thereon open at the tops and bottoms thereof for receiving articles through the tops thereof from the infeed conveyor in the predetermined orientation, an article conveyor having a plurality of pockets thereon open at the tops thereof for receiving articles through the tops thereof from the transfer conveyor in the predetermined orientation for conveying the articles in a direction different from that of the infeed conveyor, retainer structure closing the bottoms of each of the containers as it arrives in position to receive an article from the infeed conveyor and opening the bottom of each of the containers as it arrives in position to deposit an article into one of the pockets on the article conveyor.

Another object of the invention is to provide an article transfer mechanism of the type set forth wherein the transfer conveyor is formed of an endless belt with alternating groups of rollers and windows along the length thereof, the infeed conveyor depositing an article onto the transfer conveyor with the articles in the predetermined orientation, support structure disposed below a reach of the transfer conveyor temporarily to support articles deposited in the windows of the transfer conveyor, and structure for rotating the rollers to feed articles deposited thereon into an adjacent window for temporary support on the support structure.

Yet another object of the invention is to provide an article transfer mechanism of the type set forth wherein the support structure is a plate disposed below the lower reach of the transfer conveyor and closing at least one of the windows between the adjacent groups of rollers to provide a container for articles deposited in a window on the transfer conveyor and to support the article as it is conveyed by the transfer conveyor.

Still another object of the invention is to provide an article transfer mechanism for equally spacing and aligning and changing the direction of movement of the articles while maintaining the orientation of the articles, the transfer mechanism including an infeed conveyor for conveying randomly spaced articles in a first direction while maintaining the articles in a predetermined orientation, a spacing conveyor having a plurality of equally spaced article supports thereon for receiving articles from the infeed conveyor in the predetermined orientation, spacing mechanism associated with the spacing conveyor for positioning one article on an article support while maintaining the article in a predetermined orientation, an aligning conveyor for receiving the equally spaced articles from the spacing conveyor and having mechanism for aligning the articles laterally while maintaining the equal spacing thereof and the predetermined orientation thereof, a transfer conveyor having a plurality of conveyors thereon open at the tops and bottoms thereof for receiving articles through the tops thereof from the aligning conveyor with the articles in the predetermined orientation, an article conveyor having a plurality of equally spaced pockets thereon open at the tops thereof for receiving the articles through the tops thereof from the transfer conveyor in the predetermined orientation for conveying the articles in a direction different from that of the infeed conveyor, and retainer structure closing the bottom of each of the containers as it arrives in position to receive an article from the aligning conveyor and opening the bottom of each of the containers as it arrives in position to deposit an article into one of the pockets on the article conveyor.

Yet another object of the invention is to provide an improved spacing and aligning mechanism of the type set forth above.

A further object of the invention is to provide an article transfer mechanism of the type set forth including an infeed conveyor for conveying equally spaced articles in a first direction while maintaining the articles in a predetermined orientation, a transfer conveyor having a plurality of equally spaced containers thereon open at the tops and bottoms thereof for receiving articles through the tops thereof from the infeed conveyor with the articles in the predetermined orientation, drive mechanism for moving the transfer conveyor and the containers thereon through an essentially horizontal circular path while maintaining the containers in the predetermined orientation, an article conveyor having a plurality of equally spaced pockets thereon open at the tops thereof for receiving articles through the tops thereof from the transfer conveyor in the predetermined orientation for conveying articles in a direction different from that of the infeed conveyor, and retainer structure closing the bottom of each of the containers as it arrives in position to receive an article from the infeed conveyor and an opening in the bottom of each of the containers as it arrives in position to deposit an article into one of the pockets on the article conveyor.

A still further object of the invention is to provide improved transfer conveyors of the types set forth above.

Further features of the invention pertain to the particular arrangement of the parts of the article transfer mechanism and of the transfer conveyors, whereby the above outlined and additional operating features thereof are attained. The invention, both as to its organization and method of operation, together with further features and advantages thereof will best be understood with reference to the following specification taken in connection with the accompanying drawings.

DESCRIPTION OF THE PREFERRED EMBODIMENTS

Referring to FIGS. 1 to 4 of the drawings, there is illustrated a first preferred embodiment of an article transfer mechanism generally designated by numeral 100 and made in accordance with and embodying the principles of the present invention. The article transfer mechanism 100 includes an infeed conveyor in the form of a chute 110, a transfer conveyor 120 receiving articles in the form of toothpaste tubes 50 from the infeed conveyor 110, an article conveyor 180 that receives the tubes 50 from the transfer conveyor 120, and a motor 150 that drives the transfer conveyor 120 and the article conveyor 180.

The article transfer mechanism 100 is generally useful in receiving articles moving in one direction and changing the direction of movement through 90°, all while maintaining the longitudinal orientation of the article as received from the source of articles. One preferred article that may be handled using the article transfer mechanism 100 are toothpaste tubes generally designated by the numeral 50. Each tube 50 includes the usual body 51 that is flattened and closed at one end 52 and threadedly receives a cap 55 at the other end thereof.

The various parts of the article transfer mechanism 100 are mounted upon a frame designated generally by the numeral 101 and including four legs 102 joined at the top by top members 103 that are arranged longitudinally and cross members 105 arranged laterally, the cross members 105 preferably being of angle iron construction as illustrated. There also are provided side members 104, all of the named members and legs being interconnected by suitable connectors 106.

Figure 3:
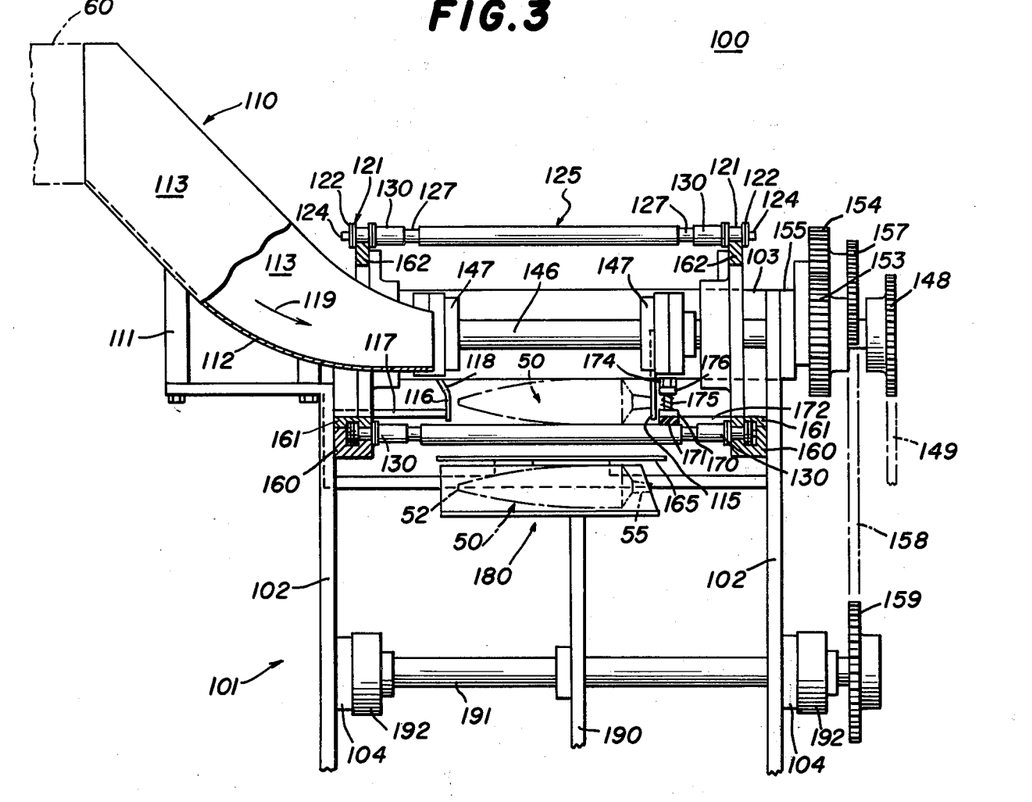
FIG. 3 is an end view as seen from the left of FIGS. 1 and 2 of the article transfer mechanism therein.

The chute 110 is mounted upon the frame 101 by means of a mounting bracket 111 (see particularly FIG. 3) and is open at the lefthand end as viewed in FIG. 3 to receive articles such as toothpaste tubes 50 from a source 60 thereof, the tubes 50 being fed to the chute 110 cap end first. The chute 110 includes more particularly a concavely curved bottom wall 112 with two upstanding side walls 113 carrying flanges 114 for assistance in mounting the chute 110. The tubes 50 are delivered cap end first from the lower end of the chute 110 in the direction of the arrow 119 (see FIG. 3) and fall upon the lower reach of the transfer conveyor 120. A stop plate 115 is provided to contact the cap 55 to position the tubes 50 essentially centrally of the transfer conveyor 120, and a guide 116 is provided to ensure that the tubes 50 do not rebound from the stop plate 115 off of the transfer conveyor 120. The guide 116 is mounted on a bracket 117 secured to the frame 101, the upper end of the guide 116 being bent at an obtuse angle to the left as viewed in FIG. 3 to provide a guide flange 118.

Figure 4:
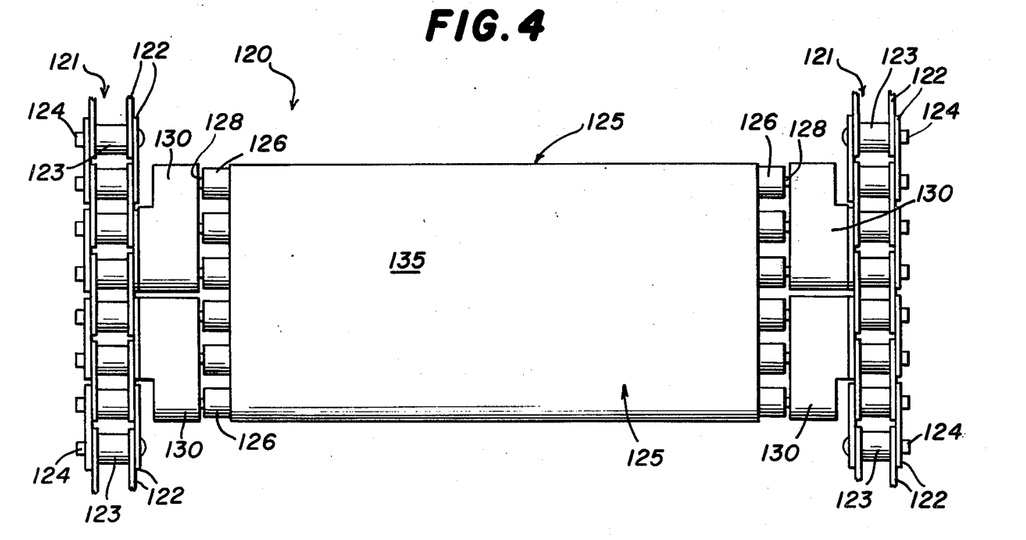
FIG. 4 is an enlarged fragmentary plan view of a portion of the roller conveyor incorporated in the article transfer mechanism of FIGS. 1 to 3.

The transfer conveyor 120 receives the tubes 50 from the chute 110 as described above along the lower reach thereof (see particularly FIGS. 1 and 3), the exit end of the chute 110 disposed to the right in FIG. 3 being disposed between the upper and lower reaches of the transfer conveyor 120. The transfer conveyor 120 includes two laterally spaced apart endless belts or chains 121 which are arranged each in a closed loop with a generally horizontal elongated upper reach and a generally horizontally arranged lower reach joined by curved portions extending around support sprockets 140 and 145 to be described more fully hereinafter. Referring to FIG. 4, the details of construction of one of the chains 121 will be described, each of the chains 121 being made up of two parallel rows of overlapping links 122 having spacers 123 disposed therebetween, pins 124 passing through and interconnecting pairs of links on each side of a spacer 123. Disposed at spaced apart points along the belts 121 are groups 125 of rollers 126, each of the groups 125 containing six of the rollers 126 as illustrated. Each of the rollers 126 is essentially circular in cross section and is provided with an opening therethrough that receives a mounting shaft 128. The rollers 126 are mounted in groups of three between the endless belts 121 by mounts 134 that are secured to adjacent ones of the links 122 on the endless belts 121. Two of the mounts 130 are arranged next to each other on each side of a group 125, opposed pairs of mounts 130 receiving the ends of three of the shafts 128 so as to mount three of the rollers 126 thereon. This mounting of the rollers 126 in groups of three facilitates the movement of the group 125 around the support sprockets for the transfer conveyor 120. Each roller group 125 has a resilient endless belt 135 disposed therearound (see particularly FIG. 1) so as to provide a smooth support surface for articles received thereon. It further is pointed out referring to FIG. 1 that the roller groups 125 are longitudinally spaced apart around the endless belts 121 with adjacent ends of adjacent roller groups 125 providing windows 136 therebetween.

Figure 1:
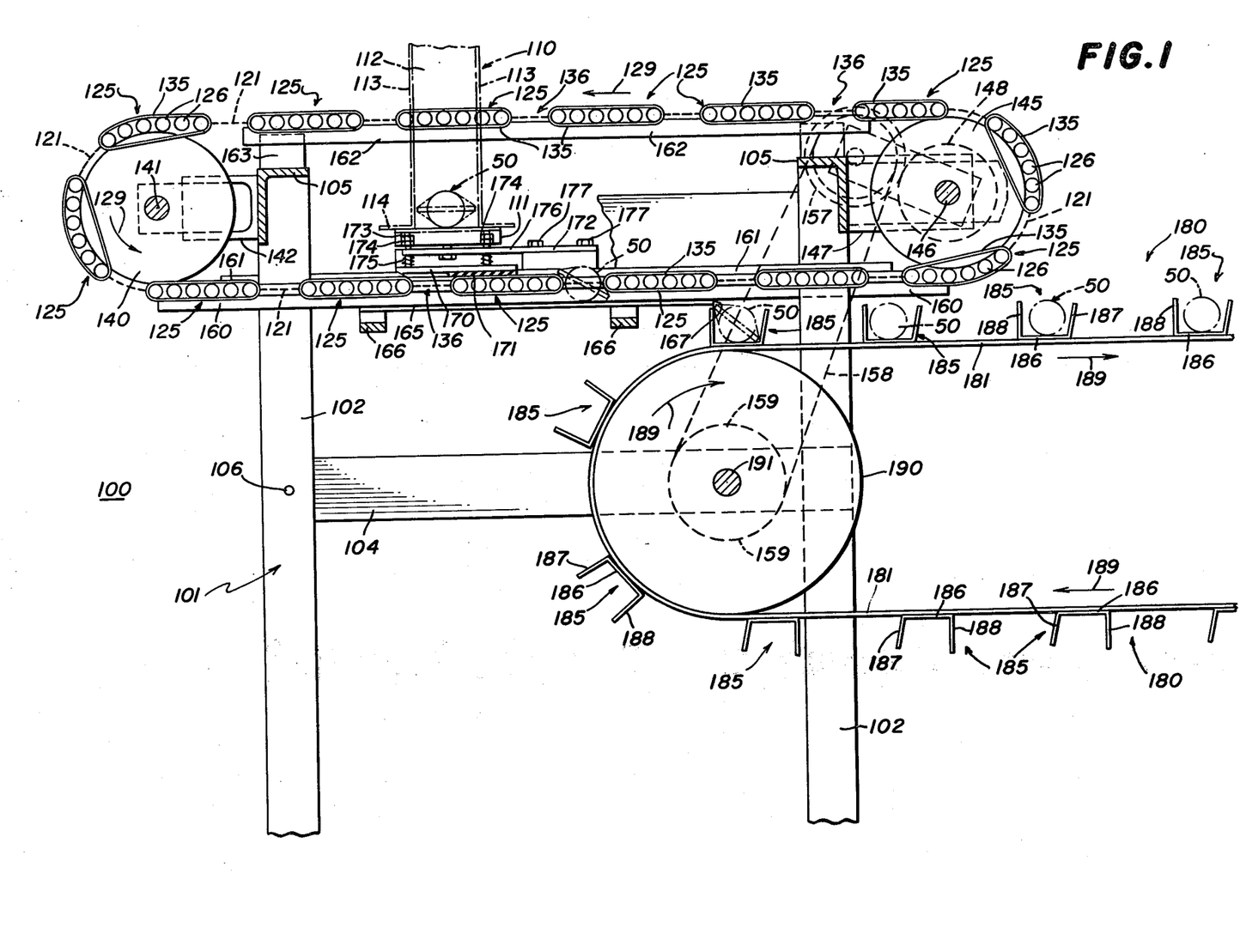
FIG. 1 is a side view with certain portions broken away of a first embodiment of an article transfer mechanism in accordance with and embodying the principles of the present invention.
Figure 2:
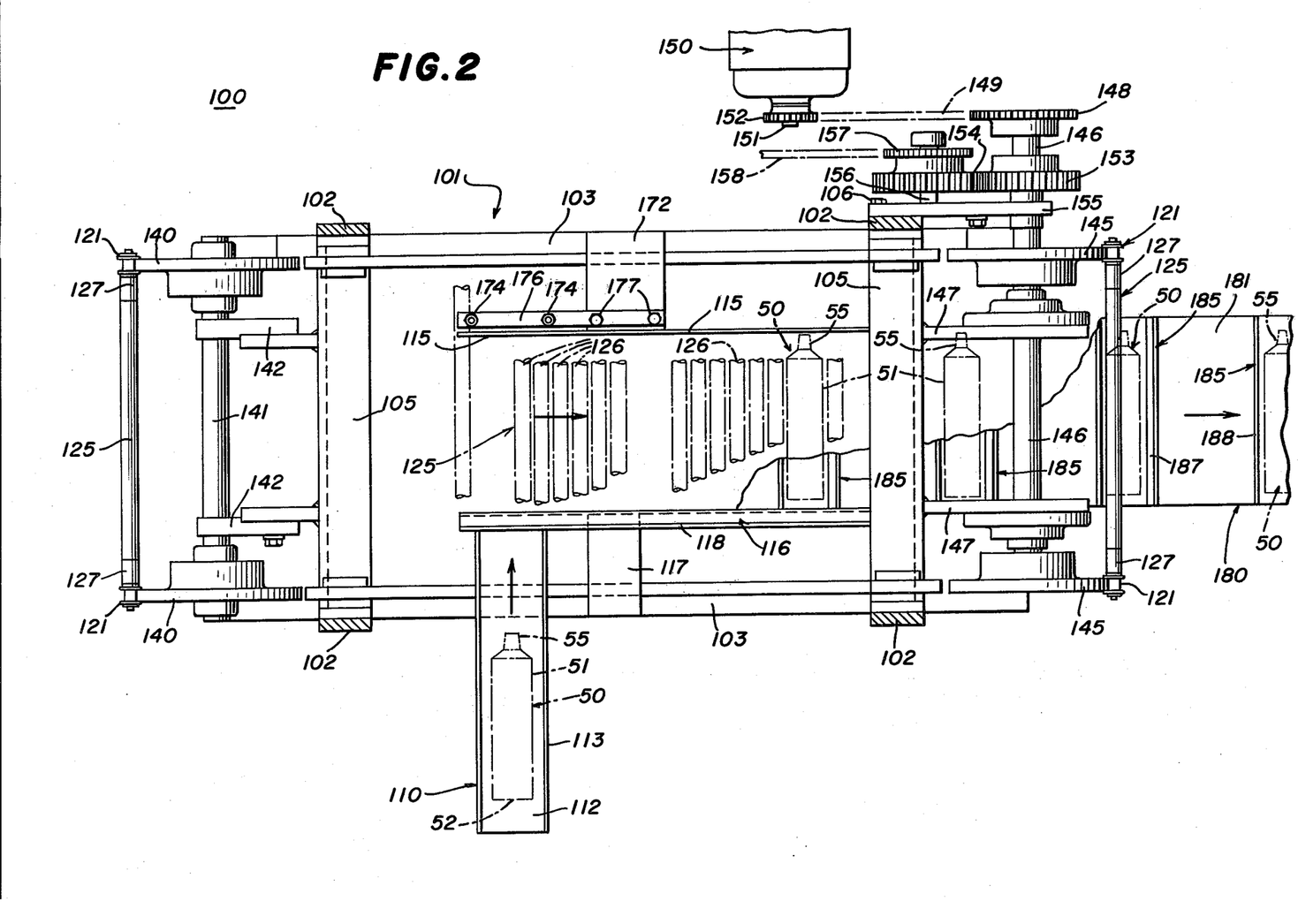
FIG. 2 is a plan view with certain portions broken away of the article transfer mechanism of FIG. 1.

The rear of the lefthand end of the transfer conveyor 120 as viewed in FIG. 1 is supported by two rear support sprockets 140 that are mounted on a shaft 141 journaled in brackets 142 disposed on the main frame 101. The forward or righthand end of the transfer conveyor 120 as viewed in FIG. 1 is supported by two laterally spaced apart front support sprockets 145 that are mounted on a shaft 146 that is journaled in brackets 147 mounted on the main frame 101. The shaft 146 extends laterally beyond the frame 101 as viewed in FIGS. 2 and 3 and carries on the outer end thereof a drive sprocket 148 that engages a chain 149 so as to provide drive power for the transfer conveyor 120.

In order to drive the transfer conveyor 120, a motor 150, preferably electric in character, has been provided and includes an output shaft 151 carrying a sprocket 152. The sprocket 152 engages the drive chain 149 so as to drive the transfer conveyor 120 through the sprocket 148 and the shaft 146. The direction of movement of the transfer conveyor 120 is designated by the arrow 129, the upper reach moving to the left as viewed in FIG. 1 and with the lower reach moving to the right as viewed in FIG. 1. In order to stabilize the movement of the transfer conveyor 120, a lower slide 160 (see FIG. 3 particularly) is provided for supporting each of the endless belts 121 along the lower reach thereof, a slide cover 161 also being provided so as to control upward movement of the lower reach of the transfer conveyor 120 as well. Upper slides 162 are provided supporting the upper reach of the transfer conveyor 120, the upper slides 162 being supported by brackets 163.

Tubes 50 falling onto the lower reach of the transfer conveyor 120 from the chute 110 may fall between two of the roller groups 125 and through the window 136 therebetween. Accordingly, there is provided a support or retainer structure 165 which extends from slightly to the left of the point of entry of the tubes 50 onto the transfer conveyor 120 to a forward end 167 which overlies the point where the tubes 50 are to be deposited onto the article conveyor 180. The support plate 165 is secured to the frame 101 by brackets 166 and is preferably "Teflon" coated or chrome plated to reduce the resistance to the sliding of the tubes 50 therealong.

On the other hand, the tubes 50 may fall upon one of the roller groups 125 rather than into and through one of the windows 136, in which case it is necessary to move the tube 50 from the roller group 125 into the next adjacent and trailing window 136 and onto the support plate 165 therebelow. To this end, a resiliently mounted shoe 170 has been provided in position to contact the upper surface of the belt 135 on a roller group 125 passing beneath the exit line from the chute 110 (see FIGS. 1 and 3 particularly). The lower surface of the shoe 170 in contact with the belts 135 has a rubber coating 171 thereon. A mounting bracket 172 secured to the frame 101 is provided carrying an arm 176 secured thereto by bolts 177, the arm 176 overlying the shoe 170. Fixedly secured to the shoe 170 are two posts 173 extending upwardly therefrom through aligned openings in the arm 176 and having the upper ends threaded and receiving adjusting nuts 174. Disposed between the lower surface of the arm 176 and the upper surface of the shoe 170 are springs 175 disposed respectively about associated posts 173. The springs 175 serve resiliently to urge the shoe 170, and specifically the covering 171 thereon, against the upper surface of the belts 135 as they move therebelow.

The tubes 50 from the chute 110 falling onto the transfer conveyor 120 ultimately end up in one of the windows 136 supported by the plate 165, either by falling directly thereinto from the chute 110 or by falling onto one of the roller groups 125 and being fed therefrom into the trailing window 136 by means of the contact of the shoe 170 and the belt 135 causing the belt 135 and the rollers 126 associated therewith to rotate in a counterclockwise direction along the lower reach as illustrated in FIG. 1. As the tubes 50 reach the forward end 167 of the support plate 165, they fall onto the article conveyor 180. As illustrated, the article conveyor 180 includes an endless belt 181 that is disposed below the forward end of the transfer conveyor 120 (see FIG. 1) and extends therefrom to the right to a point of discharge. Disposed upon the belt 181 at fixed and equally spaced distances therealong are buckets or pockets 185 for receiving the tubes 150 therein. Each of the buckets 185 has a bottom wall 186 generally rectangular in shape and secured to the belt 181 and extending transversely with respect thereto. The leading edge of the bottom wall 186 carries an upstanding leading side wall 187 disposed at a slight obtuse angle with respect to the bottom wall 186, and the trailing edge of each bottom wall 186 carries a trailing side wall 188 disposed essentially normal to the bottom wall 186, the bucket 185 being open at the top thereof.

The article conveyor 180, and specifically the belt 181 thereof, is supported by two drive and supporting wheels 190 (only one being shown), the wheel 190 being mounted on a shaft 191 carried in bearings 192 mounted on the frame 101. Drive for the supporting wheel 190 is derived from the motor 150 (see FIG. 2 also) via the chain 149 and the sprocket 148 that drives the shaft 146. Also mounted on the shaft 146 is a gear 153 that meshes with an adjacent gear 154 mounted on the shaft 156 supported by the bracket 155 mounted on the frame 101. The shaft 156 also carries a sprocket 157 driving a chain 158 that is drivingly engaged with a sprocket 159 fixed to the shaft 191. In this manner, the motor 150 serves to drive the article conveyor 180 as well as the transfer conveyor 120, thus to synchronize the movement of these two conveyors.

It further is pointed out, referring particularly to FIG. 1, that the spacing between the buckets 185 on the article conveyor 180 is equal to the spacing between the windows 136 in the transfer conveyor 120, and furthermore that one of the buckets 185 on the article conveyor 180 is always disposed immediately below one of the windows 136 in the transfer conveyor 120 when the bucket 185 and the window 136 arrive at the forward end 167 of the support plate 165. Due to the synchronization of the movements of the transfer conveyor 120 and the article conveyor 180, and the windows 136 and the buckets 185 thereon respectively, there is always a bucket 185 in position to receive an article 50 that is disposed within a window 136 and upon the support plate 165 at the forward end 167 of the support plate 165.

The operation of the article transfer mechanism 100 is as follows. Tubes 50 are dropped one by one from the source 60 down the chute 110, with the cap 55 disposed forwardly and downwardly, the tubes 50 being fed usually at irregular intervals with no effort to synchronize movement thereof with that of the transfer conveyor 120. The transfer conveyor 120 is moving in the direction of the arrows 129 driven by the motor 150, so that the lower reach thereof is moving to the right as viewed in FIG. 1, i.e., the transfer conveyor 120 is moving in a counterclockwise direction. The motor 150 simultaneously is driving the article conveyor in synchronism with the transfer conveyor 120 and in the direction of the arrows 189 in a clockwise direction. Furthermore the windows 136 are each aligned with a bucket 185 when they arrive at the forward or discharge end 167 of the support plate 165, and are moving in the same direction and to the right as viewed in FIG. 1.

As the tubes 50 arrive at the lower end of the chute 110, the longitudinal axes thereof are aligned transversely of the conveyors 120 and 180, and the article transfer mechanism 100 serves to retain this orientation throughout the transfer cycle, but changes the direction of movement from longitudinal down the chute 110 to translational along the conveyors 120 and 180. Upon arriving at the lower end of the chute 110, the tube 50 falls therefrom and against the stop plate 115, the cap 55 striking the stop plate 115, and the guide 116 assuring that the tube 50 does not bounce off of the lower reach of the transfer conveyor 120. In certain cases, the tube 50 may fall directly into one of the windows 136 and onto the support plate 165 and will then be carried along the support plate 165 to the discharge end 167 thereof where it will fall into a bucket 185 on the article conveyor 180.

In other instances, the tube 50 will fall onto one of the roller groups 125, and specifically onto the upper reach of the belt 135 associated therewith. In such a case, the contact of the shoe 170, and specifically the covering 171, with the upper reach of the belt 135 will cause the belt 135 and the associated rollers 126 to move in a counterclockwise direction and thus feed the tubes 50 rearwardly and to the left as viewed in FIG. 1 into the next trailing window 136 and onto the support plate 165. As the window 136 containing the tube 50 arrives at the discharge end 167 of the support plate 165, it will be positioned over one of the buckets 185 on the article conveyor 180 and will fall thereinto.

Figure 5:
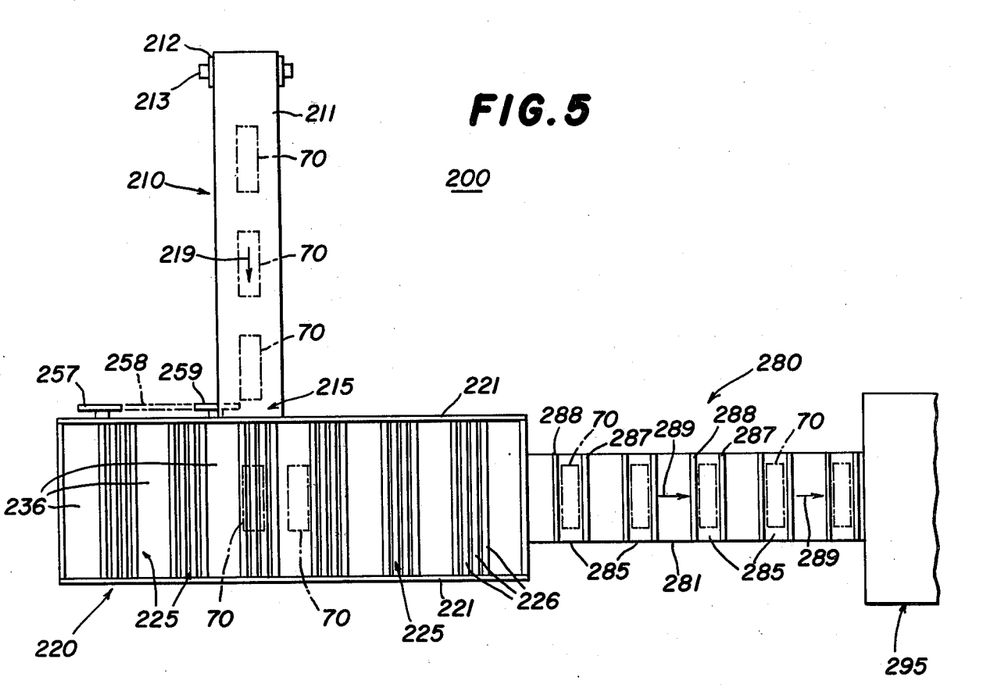
FIG. 5 is a plan view of a second embodiment of an article transfer mechanism made in accordance with and embodying the principles of the present invention.
Figure 6:
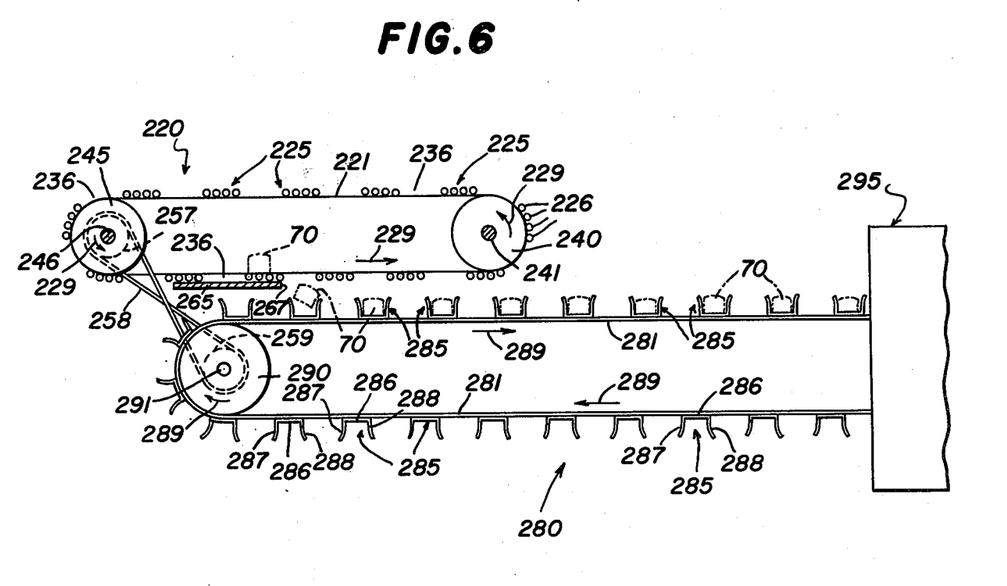
FIG. 6 is a side elevational view with certain portions broken away of the article transfer mechanism of FIG. 5.

There is illustrated in FIGS. 5 and 6 of the drawings a second preferred embodiment of an article transfer mechanism 200 made in accordance with and embodying the principles of the present invention. The article transfer mechanism 200 includes an infeed conveyor 210 feeding articles, such as pouches 70, from a source thereof to a transfer conveyor 220 which in turn deposits the pouches on an article conveyor for feeding to a subsequent processing equipment such as a cartoner 295.

The infeed conveyor 210 is in the form of a continuous belt 211 carried by support rollers 212 (only one being shown) mounted on shafts 213. A drive motor (not shown) drives the belt 211 in the direction of the arrow 219 so that the upper reach is driven towards a discharge end 215 disposed adjacent to and overlying the lower reach of the transfer conveyor 220. The infeed conveyor 210 receives pouches 70 from a source (not shown) with the longitudinal axes thereof aligned in the direction of travel of the upper reach of the belt 211. The article transfer mechanism 200 serves to change the direction of travel of the pouches 90° while maintaining the orientation thereof throughout the transfer operation.

The transfer conveyor 220 includes two endless belts 221 that support therebetween spaced groups of rollers 226. More specifically, four of the rollers 226 are illustrated supported upon the endless belt 221 in each of the groups 225. The roller groups 225 are equidistantly spaced along the transfer conveyor 221 with adjacent groups 225 defining windows 236 that are also equally spaced along the length of the transfer conveyor 220. The endless belts 221 are supported by front support sprockets 240 mounted on a shaft 241 and two rear support sprockets 245 mounted on a shaft 246. A motor (not shown) is also connected to the shaft 246 to drive the shaft 246 in a counterclockwise direction, and thus to drive the transfer conveyor 220 in a counterclockwise direction and in the direction of the arrows 229. As a result, the upper reach of the transfer conveyor 220 moves to the left as viewed in FIG. 6, while the lower reach moves to the right.

The article conveyor 280 is mounted below the transfer conveyor 220 and extends thereunder. The article conveyor 280 includes a continuous belt 281 that has upper and lower reaches arranged substantially horizontally and supported upon driving support wheels 290 (only one being shown), each support wheel 290 being mounted on a shaft 291. Secured to the belt 281 along the entire length thereof and equally spaced therealong are buckets or pockets 285, each bucket having a bottom wall 286 secured to the belt 281 and upstanding leading and trailing side walls 287 and 288 and being open at the top thereof. Drive for the article conveyor 280 is derived from the shaft 246 which carries a pulley 257 engaging a belt 258 that drives a pulley 259 secured to the shaft 291. As a result of this drive arrangement, the article conveyor in driven in a clockwise direction, and specifically in the direction of arrows 289, so that the upper reach thereof moves to the right as views in FIG. 6 while the lower reach thereof moves to the left.

Since the drive for the article conveyor 280 is derived from that for the transfer conveyor 220, the two conveyors operate in synchronism. In addition, the spacing between the windows 236 on the transfer conveyor 280 is equal to the spacing between the buckets 285 on the article conveyor 280 and furthermore the buckets along the upper reach are in synchronism and positioned immediately below an associated window 236 on the transfer conveyor 220.

In the operation of the article transfer mechanism 200, pouches 70 are fed by the infeed conveyor 210 in a lengthwise direction as illustrated in FIG. 5 and are deposited onto the lower reach of the transfer conveyor 220. In certain instances, the pouch 70 leaving the infeed conveyor 210 may fall into one of the windows 236 and onto a plate or retainer structure 265 disposed immediately therebelow. A pouch 70 in such a window 236 will be fed by the roller group 225 behind it to the forward end 267 of the support plate 265 where it will fall into a bucket 285 of the article conveyor 280 disposed therebelow. In other instances, the pouch leaving the discharge end 215 of the infeed conveyor 210 will fall onto one of the roller groups 225. In such a case, the plate 265 which is pressing against the lower surfaces of the rollers 266 in that roller group 225 will cause the rollers 226 to rotate in a counterclockwise direction and feed the pouch 70 off of the roller group 225 and into the trailing window 236 and onto the plate 265. Again the trailing roller group 225 will push the pouch 70 along the plate 265 to the forward end 267 thereof where it will fall into a bucket 285 on the article conveyor 280 disposed therebelow. The pouch 70 is then conveyed by the article conveyor 280 to the cartoner 295 for further processing.

Referring to FIGS. 7 to 12, there is disclosed a third preferred embodiment of an article transfer mechanism 300 made in accordance with and embodying the principles of the present invention. The article transfer mechanism 300 includes an infeed conveyor 310, a spacing conveyor 320 provided with a spacing mechanism 330, an aligning conveyor 340, a transfer conveyor 350 and an article conveyor 380.

Figures 7, 9:
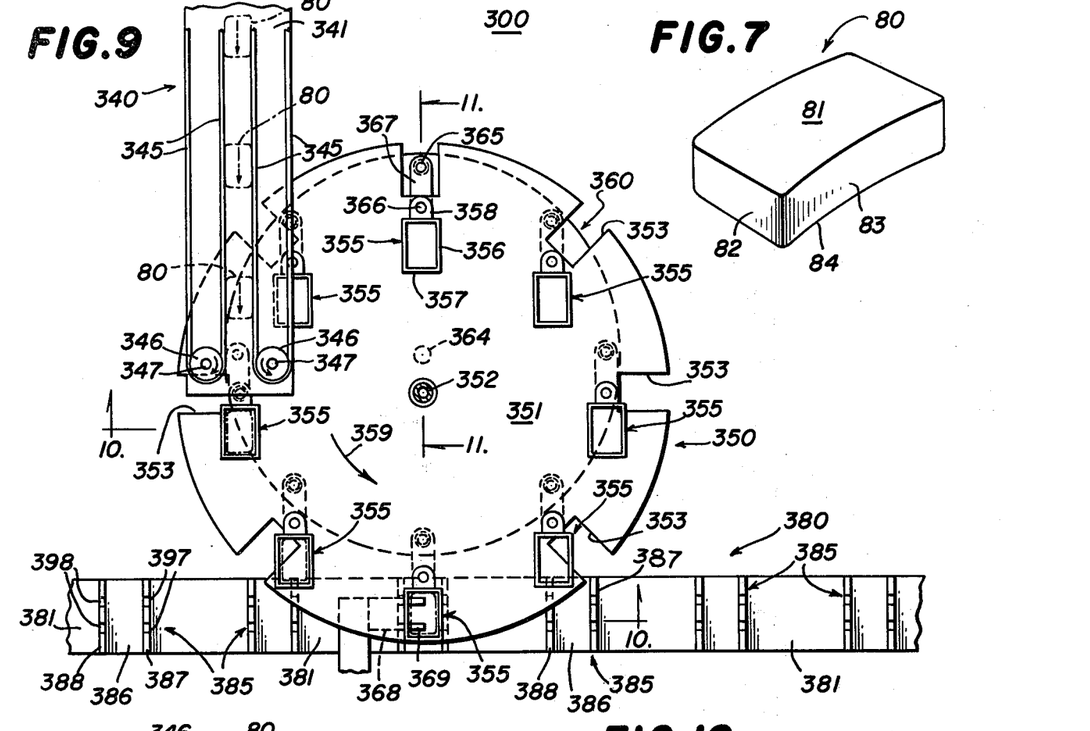
FIG. 7 is a perspective view of a bar of soap that can be successfully handled using the article transfer mechanisms of the present invention.
FIG. 9 is a fragmentary plan view of a portion of the mechanism of FIG. 8, and specifically a portion of the aligning conveyor and the transfer conveyor and the article conveyor thereof.

Referring particularly to FIG. 7, there is illustrated a bar 80 of soap which is particularly adapted to be handled by the article transfer mechanism 300. The bar 80 when fed to the article transfer mechanism 300 is fresh from a press or molding machine and has not yet hardened, whereby it is delicate and fragile and must be handled with particular care. As illustrated, the bar 80 is of generally rectangular form but has a top surface 81 that is convexly curved and a bottom surface 84 that is correspondingly concavely curved. The surfaces 81 and 84 are joined by two end surfaces 82 and two side surfaces 83.

Figure 8:
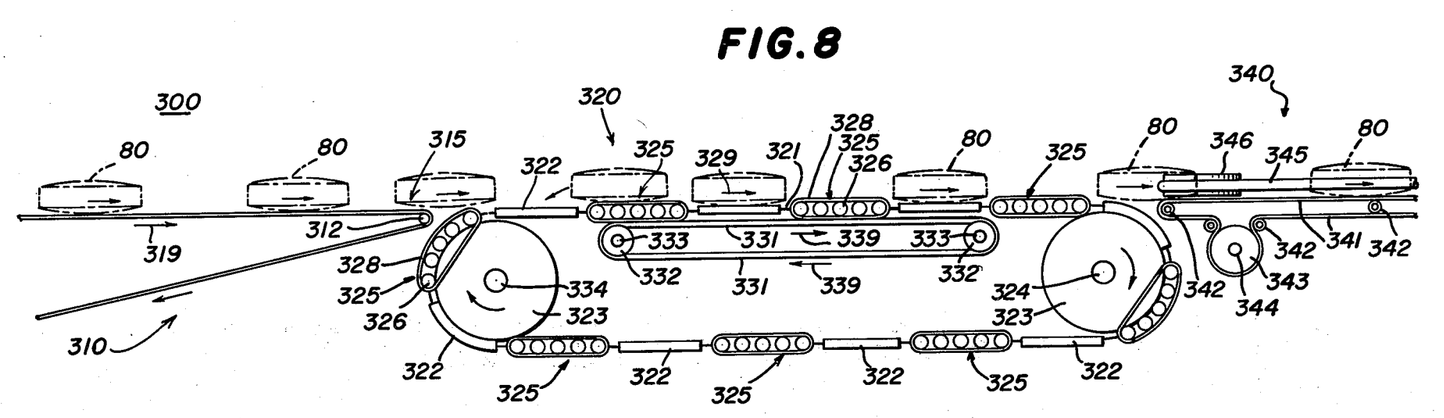
FIG. 8 is a side view of a third embodiment of an article transfer mechanism made in accordance with and embodying the principles of the present invention and incorporating therein an article spacing and aligning mechanism.
Figure 12:
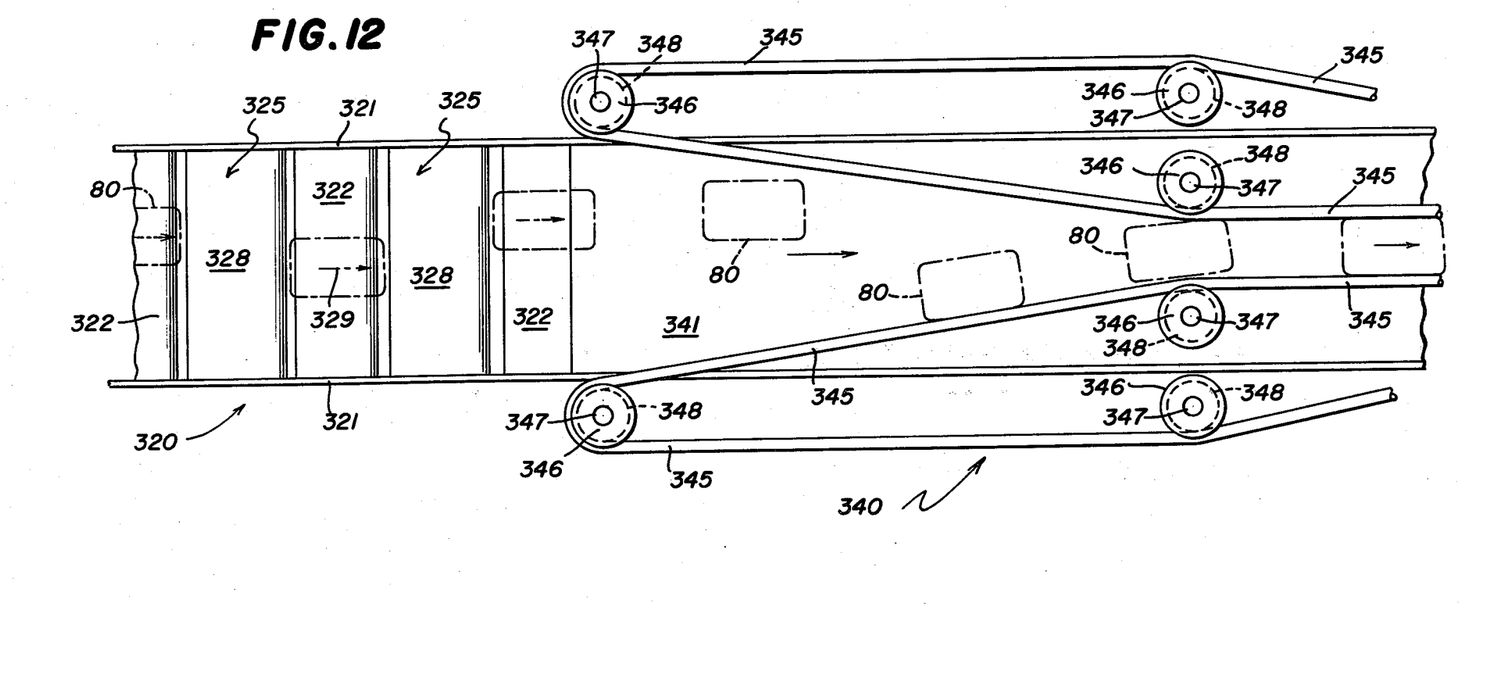
FIG. 12 is a plan view of a portion of the article transfer mechanism illustrated in FIG. 9.

Referring now to FIGS. 8 and 12 of the drawings, the details of construction of the article transfer mechanism 300 will be described. The infeed conveyor 310 includes a conveyor belt 311 mounted on support rollers 312. The belt 311 carries a series of bars 80 that are randomly placed thereon both as to longitudinal spacing and as to lateral alignment. The bars 80 are fed from the discharge end 315 of the infeed conveyor 310 onto the lefthand end of the spacing conveyor 320 as viewed in FIG. 8, the bars 80 moving in the general direction of the arrow 319.

The spacing or transfer conveyor 320 includes two essentially parallel endless belts or chains 321 that may be constructed and arranged like the endless blets or chains 121 described above with respect to the article transfer mechanism 100. The endless belts 321 carry article supports 322 that are equally spaced longitudinally therealong and alternate with groups 325 of rollers 326. The rollers 326 are supported on shafts 327 carried by the endless belts 321, the groups 325 of the rollers 326 (five rollers 326 being shown in each group 325) being covered by an endless belt 328, whereby the rollers 326 serve to support the belt 328 to provide a resilient smooth surface to receive any of the bars 80 deposited thereon. The endless belts 321 are supported on sprockets 323 mounted on shafts 324 suitably mounted in a support frame (not shown). The sprockets 323 serve to move the endless belts 321 and the article supports 322 and the groups 325 of rollers 326 in the directions of the arrows 329, i.e., the upper reach moving to the right as viewed in FIG. 8 and the lower reach moving to the left as viewed in FIG. 8.

Certain of the bars 80 from the end feed conveyor 310 will be deposited directly upon the flexible article supports 322 and will be carried thereby to the inlet end of the aligning conveyor 340. However, since the bars 80 are randomly spaced along the infeed conveyor 310, certain of the bars 80 will be deposited upon one of the groups 325 of rollers 326. In order to feed such a bar off of the roller group 325 and onto the next adjacent and trailing article support 322, a spacing mechanism 330 has been provided below the upper reach of the spacing conveyor 320. The mechanism includes a V-belt 331 supported by pulleys 332 mounted on shafts 333 journaled on the frame (not shown). The upper reach 325 of the belt 331 is positioned to contact the roller groups 325 as they pass thereover, the upper reach 335 of the V-belt 331 moving to the right as viewed in FIG. 8 and at a speed approximately 50% greater than the speed of movement of the spacing conveyor 320 which causes the lower reach of the engaged belt 328 to be moved relatively to the right as viewed in FIG. 8 thereby moving the upper reach of the engaged belt 328 to the left to deposit the bar 80 thereon upon the next adjacent and trailing article support 322. As the upper reach of the spacing conveyor 320 approaches the inlet end of the aligning conveyor 340, the bars 80 are each disposed upon an article support 322 in position to be fed onto the aligning conveyor 340.

Figure 10:
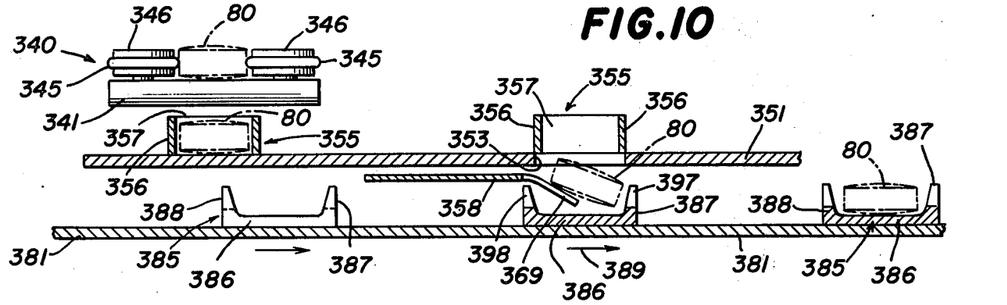
FIG. 10 is an enlarged view in section along the line of 10—10 of FIG. 9.

The details of construction of the aligning conveyor 340 are best illustrated in FIGS. 8 to 10 of the drawings, the conveyor 340 including a continuous belt 341 carried by support pulleys 342 and also passing over a drive pulley 343 mounted on a shaft 344. Mounted above and cooperating with the belt 341 are two laterally spaced apart guide belts 345 that are continuous in construction. The guide belts 345 are supported by pulleys 346 carried on shafts 347 and provided with grooves 348 around the periphery thereof to receive the guide belts 345 that are circular in cross section. The guide belts 345 are preferably formed of a polyurethane resin and serve to reduce the friction and prevent soap build-up as the bars 80 are fed by the aligning conveyor 340. The entry ends of the guide belt 345 are slightly further spaced apart as illustrated in FIG. 12 so as to provide positive lateral alignment for the bars 80 as they are fed along the aligning conveyor 340 in the direction of the arrows 349.

Figure 11:
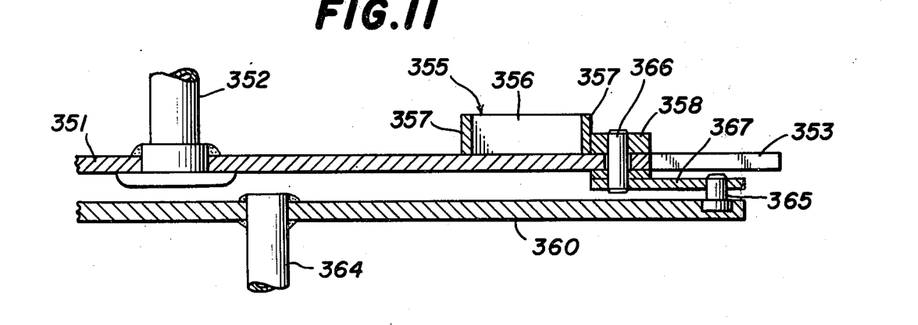
FIG. 11 is an enlarged view in section along the line 11—11 of FIG. 9.

The bars 80 as they leave the aligning conveyor 340 are in lateral alignment and are equally spaced so that they may be fed into containers 355 on the associated transfer conveyor 350, see FIGS. 9, 10 and 11 particularly. The transfer conveyor 350 includes an upper plate or wheel 351 mounted on a drive shaft 352 that is arranged essentially vertically whereby the upper plate 351 is rotated in essentially a horizontal plane and in a counterclockwise direction as indicated by the arrow 359 in FIG. 9. Formed in the periphery of the upper plate 351 are eight rectangular notches 353 equangularly arranged around the upper plate 351.

Associated with each of the notches 353 is a container 355, whereby eight of the containers 355 have been provided, so as to receive one of the bars 80 therein (see FIG. 10) and is open both at the top and the bottom thereof. Each container 355 is formed by two side walls 356 joined by end walls 357, one of the end walls 357 having an upper arm 358 fixedly secured thereto.

Disposed below the upper plate 351 is a lower plate or retainer structure 360 mounted upon a vertical shaft 364 for rotation therewith, the longitudinal axis of the shaft 364 being offset a predetermined distance laterally with respect to the longitudinal axis of the drive shaft 352 as used in FIG. 9. By a connection hereafter described, the lower plate 360 rotates with and in the same direction as the upper plate 351, but offset laterally with respect thereto as viewed in FIG. 9, whereby the lower plate 360 also rotates in a counterclockwise direction as viewed in FIG. 9, and in the direction of the arrow 359. The lower plate 360 has 8 holes therein which corresponds to the 8 notches 353 and the 8 containers 355 on the upper plate 351. A follower 365 is provided for each of the containers 355 and is disposed in one of the openings in the lower plate 360, each follower 365 being mounted on a lower arm 367 fixedly secured to a pivot post 366 that extends upwardly through the upper plate 351 and is fixedly secured to the adjacent upper arm 358 on the associated container 355. The distance between the center lines of the follower 365 and the post 366 is equal to the distance between the longitudinal center lines of the shafts 352 and 364. As a consequence, the follower 365 guided by the lower plate 360 and acting through the pivot post 366 and the arms 358 and 367 serves to hold the associated container 355 in the fixed orientation illustrated in FIG. 9, thereby to maintain the bar 80 in the fixed orientation that the bar 80 is in as it leaves the aligning conveyor 340 and is dropped into one of the containers 355 on the transfer conveyor 350.

As one of the bars 80 drops from the forward end of the aligning conveyor 340, it is in alignment to fall into one of the containers 355 disposed therebelow. At this time, the container 355 is disposed over the upper plate 351 so that the bottom thereof is closed. This condition prevails until the parts reach a position such that the container 355 is directly below the drive shaft 352 as viewed in FIG. 9, at which time the container 355 is in alignment with the associated rectangular notch 353. At this time the bar 350 falls through the notch 353 and onto a slide 368 that is mounted on the frame and has two fingers 369 that serve gently to drop the bar 80 from the container 355 on the transfer conveyor 350 onto the article conveyor 380. The container 355 then continues in a counterclockwise direction, always maintained in the same orientation and is again introduced below the discharge end of the aligning conveyor 340 to receive another bar 80 therefrom.

The article conveyor 380 is formed as a continuous belt 381 suitably supported for travel to the right in the direction of the arrows 389 in FIG. 10 on a support (not shown). Disposed at equally distanced points along the belt 381 are buckets or pockets 385, each of the buckets 385 having a bottom wall 386 disposed transversely and having the leading and trailing edges thereof provided with a leading side wall 387 and a trailing side wall 388, respectively. In order to accommodate the fingers 369 in the slide 368, the side walls 387 and 388 are provided with notches 397 and 398, respectively.

The transfer conveyor 350 and the article conveyor 380 are operated in synchronism so that the containers 355 and the buckets 385 move at the same rate. Furthermore, the conveyors 350 and 380 and the containers 355 and the buckets 385 thereon are arranged so that one of the buckets 385 is disposed immediately below one of the containers 355 when these parts are immediately below the drive shaft 352 as viewed in FIG. 9, i.e., when the container 355 is in alignment with the associated rectangular notch 353 to drop a bar 80 therethrough and into the associated bucket 385 disposed therebelow.

The several conveyors in the article transfer mechanism 300 have the rates of travel thereof adjusted to accommodate the article in the form of the bar 80 and the various manipulations to be effected thereon. The infeed conveyor 310 operates at a speed expressed in inches per minute that is only slightly more than the length of the product or article length to be conveyed thereby, i.e., the length of the bar 80. The linear speed of the spacing conveyor 320 is essentially equal to the speed of the infeed conveyor 310 but is slower than that of the aligning conveyor 340. As mentioned heretofore, the V-belt 331 operates at a speed that is essentially 50% greater than that of the spacing conveyor 320. The aligning conveyor 340 and the transfer conveyor 350 and the article conveyor 360 operate at the same speed and in synchronism, that speed being slightly faster than that of the infeed conveyor 310 and the spacing conveyor 320, and may typically be approximately 25% faster.

In the operation of the article transfer mechanism 300, articles such as the bars 80 are fed from a machine such as a soap molding machine onto the infeed conveyor 310, the bars 80 being spaced longitudinally thereon randomly and being in no particular lateral alignment. The infeed conveyor 310 feeds the bars 80 in the direction of the arrows 319 onto the spacing conveyor 320 which is traveling at a linear speed equal to that of the infeed conveyor 310.

The bar 80 fed from the discharge end 315 of the infeed conveyor 310 may be deposited upon one of the article supports 322 directly, in which case the bar 80 is carried by the article support 322 the length of the spacing conveyor 320 and is deposited onto the aligning conveyor 340. In other cases the bar 80 from the discharge end 315 of the infeed conveyor 310 falls upon one of the roller groups 325. In this case, the spacing mechanism 330, and specifically the V-belt 331 thereof contacting the lower reach of the roller belt 328 and moving at a speed essentially 50% greater than that of the spacing conveyor 320, will serve to move the upper reach of the roller belt 328 to the left and deposit the bar 80 upon the next adjacent trailing article support 322. As a result of the action of the spacing conveyor 320 and the spacing mechanism 330, all of the bars 80 fed from the spacing conveyor 320 are disposed upon article supports 322 that are spaced apart a predetermined distance, whereby the bars 80 are all placed upon the aligning conveyor 340 in equally spaced apart longitudinal relation.

The aligning conveyor 340 serves not only to convey the bars 80 to the transfer conveyor 350, but also serves to correct any lateral misalignment thereof by the action of the guide belts 345. The guide belts 345 also gently handle the delicate bars 80 and do not rub any appreciable amount of material therefrom so as to leave the bars 80 unmarred. The bars 80 as they are fed from the aligning conveyor 340 are in lateral alignment and are equally spaced apart longitudinally, although it will be understood that there may be gaps in the spacing, but all of the bars 80 are spaced at predetermined points so as to drop into one of the buckets 355 on the article conveyor 350. The aligning conveyor 340 operates at a speed slightly greater than that of the infeed conveyor 310 and the spacing conveyor 320, and at a speed matching that of the transfer conveyor 350 and the article conveyor 380.

As a bar 350 reaches the discharge end of the aligning conveyor 340, one of the containers 355 on the transfer conveyor 350 is being positioned below the discharge end of the aligning conveyor 340. The bar 80 is softly and gently dropped from the discharge end of the aligning conveyor 340 onto the upper plate 351 and within the container 355. The transfer conveyor 350, and specifically the upper plate 351 and the containers 355 thereon continue in a counterclockwise direction as indicated by the arrow 359. During this motion, the follower 365 serves to maintain the container 355 and the bar 80 within in the same orientation as received from the aligning conveyor 340.

As the container 355 carrying the bar 80 from the aligning conveyor 340 arrives at the lowermost position illustrated in FIG. 9, the container 355 moves into alignment with the associated rectangular notch 353 and thus permits the bar 80 to fall from the container 355. The bar 80 falls onto the slide 368 and is guided by the fingers 369 into the bucket 385 disposed therebelow. The fingers 369 extend almost to the bottom of the associated bucket 385 so as gently to deposit the bar 80 therein. The notches 397 and 398 in the side walls 387 and 388, respectively, accommodate this downward positioning of the fingers 369. Since the article conveyor 380 moves in synchronism with the transfer conveyor 350, one of the buckets 385 is always in position to receive on of the bars 80 from an overlying container 355. The article conveyor 380 then serves to convey the bar 80 to the next processing station.

While there have been described what are at present considered to be the preferred embodiment of the invention, it will be understood that the various modifications may be made therein, and it is intended to cover in the appended claims all such modifications as fall within the true spirit and scope of the invention.

What is claimed is:

1. Article transfer mechanism for changing the direction of movement of articles while maintaining the orientation of the articles, the transfer mechanism comprising an infeed conveyor for conveying articles in a first direction while maintaining the articles in a predetermined orientation, a transfer conveyor in the form of a continuous belt having a plurality of groups of rollers with windows therebetween open at the tops and bottoms thereof for receiving articles through the tops from said infeed conveyor in the predetermined orientation, an article conveyor having a plurality of pockets thereon open at the tops thereof for receiving articles through the tops thereof from said transfer conveyor in the predetermined orientation for conveying the articles in a direction different from that of said infeed conveyor, retainer structure closing the bottoms of each of said windows as it arrives in position to receive an article from said infeed conveyor and opening the bottom of each of said windows as it arrives in position to deposit an article into one of said pockets on said article conveyor, whereby said article transfer mechanism transfers articles from said infeed conveyor moving in one direction with the articles in a predetermined orientation and deposits the articles in pockets on said article conveyor moving in another direction while maintaining the articles in the predetemined orientation.

2. The article transfer mechanism set forth in claim 1, wherein said infeed conveyor is an endless belt carrying the articles on the upper reach thereof.

3. The article transfer mechanism set forth in claim 1, wherein said first direction of said infeed conveyor is normal to another direction of said article conveyor.

4. Article transfer mechanism for changing the direction of movement of articles while maintaining the orientation of the articles, the transfer mechanism comprising an infeed conveyor for conveying articles in a first direction while maintaining the articles in a predetermined orientation, a transfer conveyor in the form of a continuous belt having a plurality of groups of rollers thereon with windows between said groups or rollers for receiving articles from said infeed conveyor in the predetermined orientation, a plate disposed below the lower reach of said transfer conveyor and closing at least one of said windows between adjacent groups of rollers for receiving an article deposited in a window on said transfer conveyor and to support the article as it is conveyed by said transfer conveyor, said plate rotating said groups of rollers to cause said group of rollers to move an article deposited thereon into an adjacent one of said windows and onto said plate, an article conveyor having a plurality of pockets thereon open at the tops thereof for receiving articles through the tops thereof from the windows between adjacent groups of rollers at the end of said plate in a predetermined orientation for conveying the articles in a different direction from that of said infeed conveyor, whereby said article transfer mechanism transfers articles from said infeed conveyor moving in one direction with the articles in a predetermined orientation and deposits the articles in pockets on said article conveyor moving in another direction while maintaining the articles in the predetermined orientation.

5. The article transfer mechanism set forth in claim 4, wherein said plate is provided with an anti-friction coating to facilitate movement of articles therealong.

6. A transfer conveyor for transferring from an infeed conveyor articles moving in one direction and in a predetermined orientation to an article conveyor having a plurality of pockets thereon and moving in a different direction from that of the infeed conveyor, said transfer conveyor comprising an endless belt with alternating groups of rollers and windows along the length thereof, said endless belt being positioned to receive an article from the associated infeed conveyor with the article in the predetermined orientation, and support structure disposed below a reach of the endless belt temporarily to support articles deposited in the windows thereof, said support structure rotating said groups of rollers to feed articles deposited thereon into an adjacent window for temporary support on said support structure, said support structure having a discharge end for discharging articles from the windows in said endless belt into one of the pockets in an associated article conveyor disposed therebelow in the predetermined orientation for conveying the articles in a direction different from that of the associated infeed conveyor.

7. A transfer conveyor for transferring from an infeed conveyor articles traveling in a first direction and in a predetermined orientation to an article conveyor having a plurality of pockets thereon and moving in a different direction from that of the infeed conveyor, said transfer conveyor comprising a continuous belt having a plurality of groups of rollers thereon with windows between groups of rollers for receiving articles from the associated infeed conveyor in the predetermined orientation, and a plate disposed below the lower reach of said continuous belt and closing at least one of said windows between adjacent groups of rollers for receiving an article deposited in a window on said endless belt and to suppot an article as is conveyed by said endless belt, said plate rotating said groups of rollers to cause said groups of rollers to move an article deposited thereon into an adjacent one of said window and on to said plate, said plate having a discharge end disposed over an associated article conveyor so as to deposit articles into a pocket from said plate in a predetermined orientation for conveying the articles by the article conveyor in a direction different from that of the associated infeed conveyor.

* * * * *